(12) United States Patent
Tomioka et al.

(10) Patent No.: US 12,093,791 B2
(45) Date of Patent: Sep. 17, 2024

(54) PARTITIONING FOR AN EXECUTION PIPELINE

(71) Applicant: Microsoft Technology Licensing, LLC, Redmond, WA (US)

(72) Inventors: Ryota Tomioka, Cambridge (GB); Juliana Patrícia Vicente Franco, Cambridge (GB); Alberto Magni, Cambridge (GB); Nuno Claudino Pereira Lopes, Cambridge (GB); Siddharth Krishna, Cambridge (GB); Renato Golin, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 811 days.

(21) Appl. No.: 16/854,868

(22) Filed: Apr. 21, 2020

(65) Prior Publication Data
US 2021/0304066 A1    Sep. 30, 2021

(51) Int. Cl.
*G06N 20/00* (2019.01)
*G06F 9/38* (2018.01)

(52) U.S. Cl.
CPC .......... *G06N 20/00* (2019.01); *G06F 9/3867* (2013.01)

(58) Field of Classification Search
USPC .......................................................... 706/12
See application file for complete search history.

(56) References Cited

U.S. PATENT DOCUMENTS

| | | | |
|---|---|---|---|
| 7,716,525 B1 * | 5/2010 | Buchko | H04L 51/23 |
| | | | 714/24 |
| 7,844,959 B2 | 11/2010 | Isard | |
| 7,870,556 B2 | 1/2011 | Whole et al. | |
| 9,122,523 B2 | 9/2015 | Pienaar et al. | |
| 9,477,532 B1 | 10/2016 | Hong et al. | |
| 10,437,648 B2 | 10/2019 | John et al. | |
| 2014/0214880 A1 * | 7/2014 | Chi | G06F 16/2453 |
| | | | 707/768 |
| 2019/0205487 A1 * | 7/2019 | Tamiya | G06F 30/392 |
| 2020/0303060 A1 * | 9/2020 | Haemel | G06N 3/082 |
| 2020/0348912 A1 * | 11/2020 | Katzenberger | G06F 8/31 |
| 2020/0349469 A1 * | 11/2020 | Katzenberger | G06F 9/30079 |
| 2021/0012236 A1 * | 1/2021 | Carrasco | G06N 3/08 |
| 2021/0142177 A1 * | 5/2021 | Mallya | G06N 3/084 |
| 2022/0101438 A1 * | 3/2022 | Gao | G06Q 30/0201 |
| 2022/0261631 A1 * | 8/2022 | Cohen | G06N 20/00 |
| 2022/0413433 A1 * | 12/2022 | Parra Pozo | G03H 1/0005 |

OTHER PUBLICATIONS

Hess, Berk, "P-LINCS: A Parallel Linear Constraint Solver for Molecular Simulation", In Journal of Chemical Theory and Computation, vol. 4, Issue 1, Aug. 9, 2007, pp. 116-122.

(Continued)

*Primary Examiner* — Gregory B Sefcheck
*Assistant Examiner* — Majid Esmaeilian
(74) *Attorney, Agent, or Firm* — Barta Jones, PLLC

(57) ABSTRACT

A computation graph of a machine learning model is accessed from memory and a constraint solver is used to compute a partition of the computation graph into ordered stages of an execution pipeline. In use, when inference or training of the machine learning model takes place by executing the pipeline, execution cost of the stages are balanced according to the computed partition.

20 Claims, 9 Drawing Sheets

(56) References Cited

OTHER PUBLICATIONS

"International Search Report and Written Opinion Issued in PCT Application No. PCT/US2021/018956", Mailed Date: Jun. 18, 2021, 12 Pages.
Sparks, et al., "KeystoneML: Optimizing Pipelines for Large-Scale Advanced Analytics", In Proceedings of the International Conference on Data Engineering, Apr. 19, 2017, pp. 535-546.
"Application as Filed in U.S. Appl. No. 16/585,105", filed Sep. 27, 2019, 41 Pages.
Harlap, et al., "PipeDream: Fast and Efficient Pipeline Parallel DNN Training", In Journal of Computing Research Repository, Jun. 8, 2018, pp. 1-14.
He, et al., "Deep Residual Learning for Image Recognition", In Journal of Computing Research Repository, Dec. 10, 2015, pp. 1-12.
Huang, et al., "GPipe: Efficient Training of Giant Neural Networks using Pipeline Parallelism", In Journal of Computing Research Repository, Nov. 16, 2018, pp. 1-11.
Aich, Larissa, "Graph Partitioning and Scheduling for Distributed Dataflow Computation", In thesis Submitted to University of Stuttgart, Mar. 16, 2017, 71 Pages.
Mirhoseini, et al., "A Hierarchical Model for Device Placement", In Proceedings of Sixth International Conference on Learning Representations, Apr. 30, 2018, pp. 1-11.
Mirhoseini, et al., "Device Placement Optimization with Reinforcement Learning", In Proceedings of the 34th International Conference on Machine Learning, Aug. 6, 2017, 10 Pages.
Narayanan, et al., "PipeDream: Generalized Pipeline Parallelism for DNN Training", In Proceedings of the 27th ACM Symposium on Operating Systems Principles, Oct. 27, 2019, pp. 1-15.
Oliveira, et al., "Partitioning Convolutional Neural Networks to Maximize the Inference Rate on Constrained IoT Devices", In Journal of Future Internet , vol. 11, Issue 10, Oct. 2019, pp. 1-30.
Phanishayee, Amar, "PipeDream: A More Effective Way to Train Deep Neural Networks Using Pipeline Parallelism", Retrieved from: https://www.microsoft.com/en-us/research/blog/pipedream-a-more-effective-way-to-train-deep-neural-networks-using-pipeline-parallelism/, Oct. 28, 2019, 09 Pages.
Verbelen, et al., "Graph Partitioning Algorithms for Optimizing Software Deployment in Mobile Cloud Computing", In Journal of Future Generation Computer Systems, vol. 29, Issue 2, Feb. 2013, pp. 451-459.
Zhou, et al., "GDP: Generalized Device Placement for Dataflow Graphs", In Journal of Computing Research Repository, Sep. 28, 2019, pp. 1-11.

* cited by examiner

PARTITIONING FOR AN EXECUTION PIPELINE

BACKGROUND

Execution pipelines are widely used in computer science for efficient computation where large amounts of data are to be processed and there is a need for scalability: that is, to enable computation to be carried out at practical time scales where the amount of data to be processed and/or the execution cost is anticipated to be very large. Computer vision, robotics, intelligent sensing and control and machine learning are non-limiting examples of computing application domains where pipelined execution is used.

An execution pipeline is made up of a plurality of ordered stages where each stage is a computing process executing on one or more machines. Typically the machines are in communication with one another via a communications network such that distributed computing is facilitated to enable scalability. The stages are ordered since the output of one stage is the input of another stage according to the ordering of the stages in a serial process. An execution pipeline gives scalability through the use of parallelization since different ones of the stages are able to be working on different parts of the process at the same time. That is, a first stage may have processed a first batch of data and given its output to a second stage. The second stage processes the information it receives from the first stage whilst at the same time the first stage processes a second batch of data.

Where an execution pipeline is used, code of a process to be executed by the pipeline is partitioned between the stages of the execution pipeline. Typically the partition is computed manually which is time consuming. Manually computed partitions often lead to inefficiencies.

The embodiments described below are not limited to implementations which solve any or all of the disadvantages of known processes of partitioning data and/or code into stages of an execution pipeline.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computer-implemented method. A computation graph of a machine learning model is accessed from memory and a constraint solver is used to compute a partition of the computation graph into ordered stages of an execution pipeline. In use, when inference or training of the machine learning model takes place by executing the pipeline, execution cost of the stages are balanced according to the computed partition.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

A computation graph representing a machine learning model is a plurality of vertices connected by edges. Each vertex represents an operation of the machine learning model and each edge represents a communication between two operations.

The technology described herein is operable for any machine learning model which is representable using a computation graph. A non-exhaustive list of suitable examples of machine learning model is: convolutional neural network, recurrent neural network, generative adversarial network, variational autoencoder, random decision forest, bidirectional transformer-based encoder and decoder models.

Figure 1:
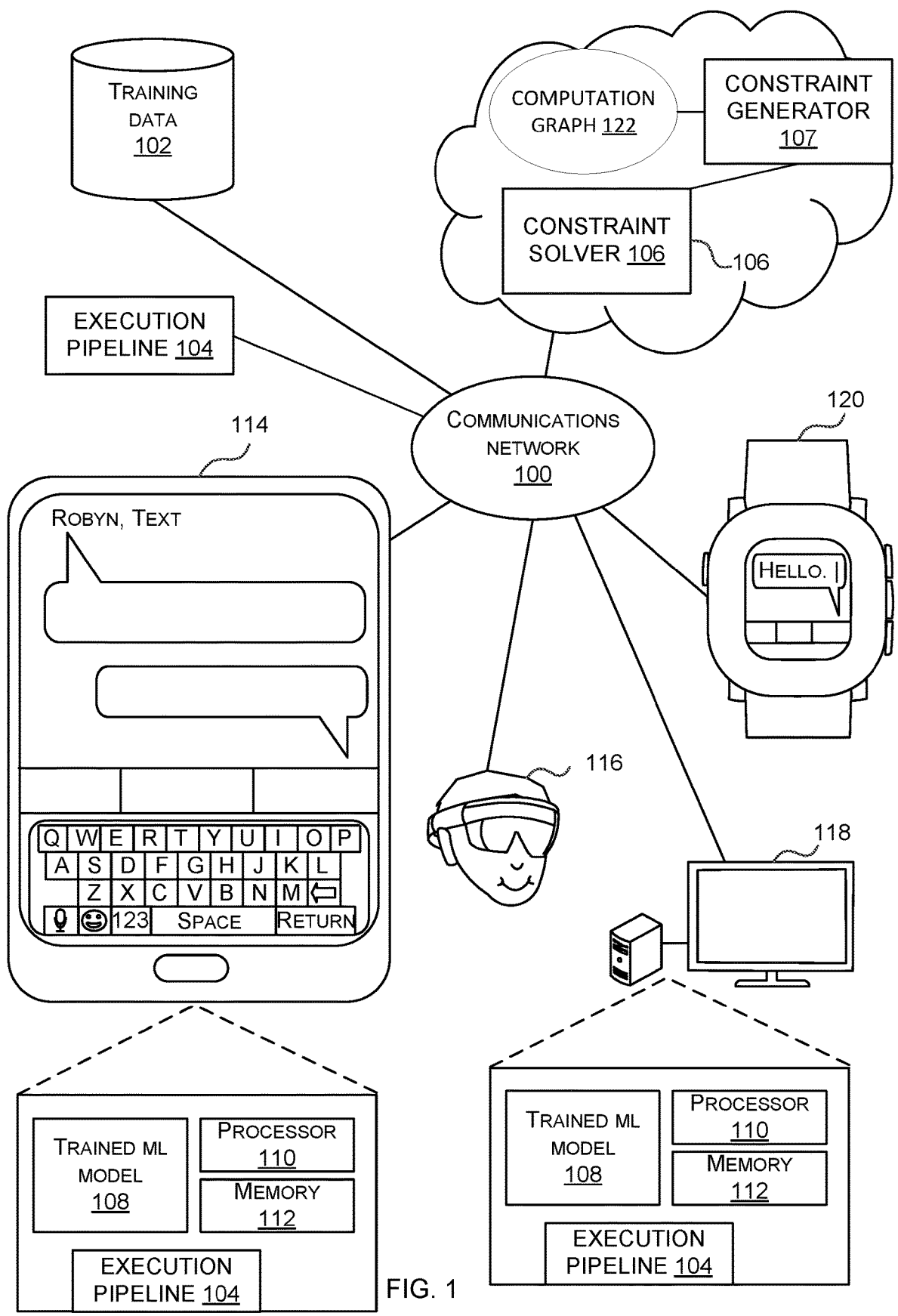
FIG. 1 is a schematic diagram of an execution pipeline deployed as a cloud service.

FIG. 1 is a schematic diagram of an execution pipeline 104 deployed as a cloud service and also of a constraint solver 106 deployed as a cloud service. In some cases the execution pipeline is deployed in an end user device such as a smart phone with a multi-core central processing unit and a graphics processing unit (see 114 of FIG. 1) or a desk top computer (see 118 of FIG. 1) with many graphics processing units and/or artificial intelligence accelerators. The execution pipeline 104 is described in more detail with reference to FIG. 2 and it comprises a plurality of stages which are ordered. Each stage executes part of a process which carries out inference using a machine learning model or a process which trains a machine learning model. Processes which are hybrids between machine learning inference and training are also executed by the execution pipeline 104 in some examples. By using an execution pipeline scalability is achieved with regard to factors including one or more of: a number of parameters of the machine learning model, an amount of training data to be used. The execution pipeline gives scalability because it is deployed on a plurality of machines and parallelization is exploited. The parallelization is model parallelization whereby a computation graph 122 representing a machine learning model is divided into partitions and individual ones of the partitions are executed in different stages of the execution pipeline. In some examples data parallelization is also used in combination with model parallelization. Data parallelization is where data is divided into batches and the batches are processed using parallelization. However, it is not essential to use data parallelization.

Often the limited amount of memory available in modern machines, such as graphics processing units (GPUs) and artificial intelligence accelerators, is not enough to fit large computation graphs corresponding to for example state-of-the-art artificial neural network models. An option is to shard (or partition) the computational graph across different machines, that is, to divide the computation across different machines. However, doing so manually is a complex and tedious task: different classes of computation graphs require different sharding strategies: developers who design these computation graphs need to be familiar with the low level architecture of the machines they use: potentially every individual operation needs to be annotated with some machine identifier: and finally, developers may need more than one iteration until they find a sharding with acceptable performance.

Partitioning the computation graph 122 manually is time consuming and error prone. It leads to inefficiencies because computational load is often uneven between stages of the execution pipeline 104. Finding a way to automatically partition the computation graph 122 is not straightforward to achieve in a scalable manner.

One option is to use dynamic programming to automatically partition the computation graph. Dynamic programming appears at first sight to be a scalable approach however, it is inefficient since most of the search space is explored and a dense matrix is computed. In order to facilitate hardware utilization it may be necessary to use a scheduler in conjunction with the dynamic programming. However, addition of a scheduler adds to complexity as well as hindering scalability.

Another option is to use reinforcement learning whereby a sequence to sequence model is used to suggest a partition for a given computation graph. Many suggestions are generated using the sequence to sequence model and the suggestions are executed on hardware to empirically determine execution time. The execution time is used as a reward function to train the sequence to sequence model using reinforcement learning. However, sequence to sequence models are not scalable to cases where the computation graph has thousands of nodes.

In the present disclosure it is recognized that a constraint solver 106 is workable to partition the computation graph 122 into stages of the execution pipeline 104. This recognition has been made despite the fact that constraint solvers are typically time consuming since they search through vast search spaces to find solutions and uses constraints to limit the search spaces in order to find those solutions. It has been unexpectedly found that using a constraint solver to partition a computation graph of a machine learning model is achievable in practical time scales. In addition, using a constraint solver to partition a computation graph of a machine learning model enables a plurality of factors to be taken into account by encoding the factors into the constraints of the constraint solver. In this way it is possible to obtain a partition of the computation graph 122 into execution pipeline stages so that execution cost of a plurality of machines deploying the execution pipeline 104 is taken into account and efficiencies are gained. The term "execution cost" is used to mean any one or more of: execution cycles, execution time, energy use.

Constraint solving is more flexible than dynamic programming and with constraint solving it is easier to encode less common constraints. Constraint solvers have many optimizations that allow them to ignore large parts of the search space, whilst a dynamic programming-based approach requires going through most of the search space and computing a dense matrix. In the deployments described herein, since the margin for error regarding memory is low, there is little luxury of being able to use simplifications in the constraint solver.

A constraint generator 107 is used to compute constraints to be used by the constraint solver 106. The constraint generator 107 takes as input a computation graph 122.

In an example the execution pipeline 104 is deployed to processes training data 102 which is accessed via communications network 100 and train the machine learning model. The training data 102 comprises labelled data instances such as images, graphical representations of molecules, speech signals, text, sensor data, knowledge graphs or other types of data instances.

In some examples the execution pipeline 104 is deployed to carry out inference using the machine learning model. It receives test data instances from sources via the communications network 100 such as end user devices 114, 116, 118, 120, computes inferences using the execution pipeline and sends the inference results back to the appropriate end user device.

In some examples the execution pipeline 104 trains the machine learning model and then the machine learning model is instantiated at one or more of the end user devices 114, 116, 118, 120. Once the machine learning model has been instantiated at an end user device the end user device is able to carry out inference locally at the end user device. FIG. 1 shows an instantiation of the machine learning model 108 at end user device 114. The end user device has a processor 110 and memory 112 and is able to carry out inference using the trained machine learning model at the end user device 114 such as to offer candidate text items in a predictive keyboard of a chat application.

As mentioned above, the execution pipeline is deployed at the end user device in some cases and carries out inference and/or training of a machine learning model at the end user device.

The constraint solver of the disclosure operates in an unconventional manner to achieve efficient execution of the execution pipeline of the disclosure by enabling control of relative execution cost of stages of the execution pipeline.

The constraint solver improves the functioning of the underlying computing device at least by enabling control of relative execution cost of stages of an execution pipeline.

Practical applications of the execution pipeline and constraint solver include using a machine learning model to carry out tasks such as recognizing objects depicted in videos or images, lip reading, medical image analysis, operating a self-driving vehicle, controlling a domestic heating system, controlling a telecommunications network, detecting anomalies in communications networks, and many other tasks where machine learning models are used. Practical applications of the execution pipeline also include training a machine learning model to carry out any practical task such as those mentioned above and other practical tasks which are carried out by machine learning models.

Alternatively, or in addition, the functionality of the constraint solver and/or execution pipeline described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs), machine learning accelerators.

Figure 2:
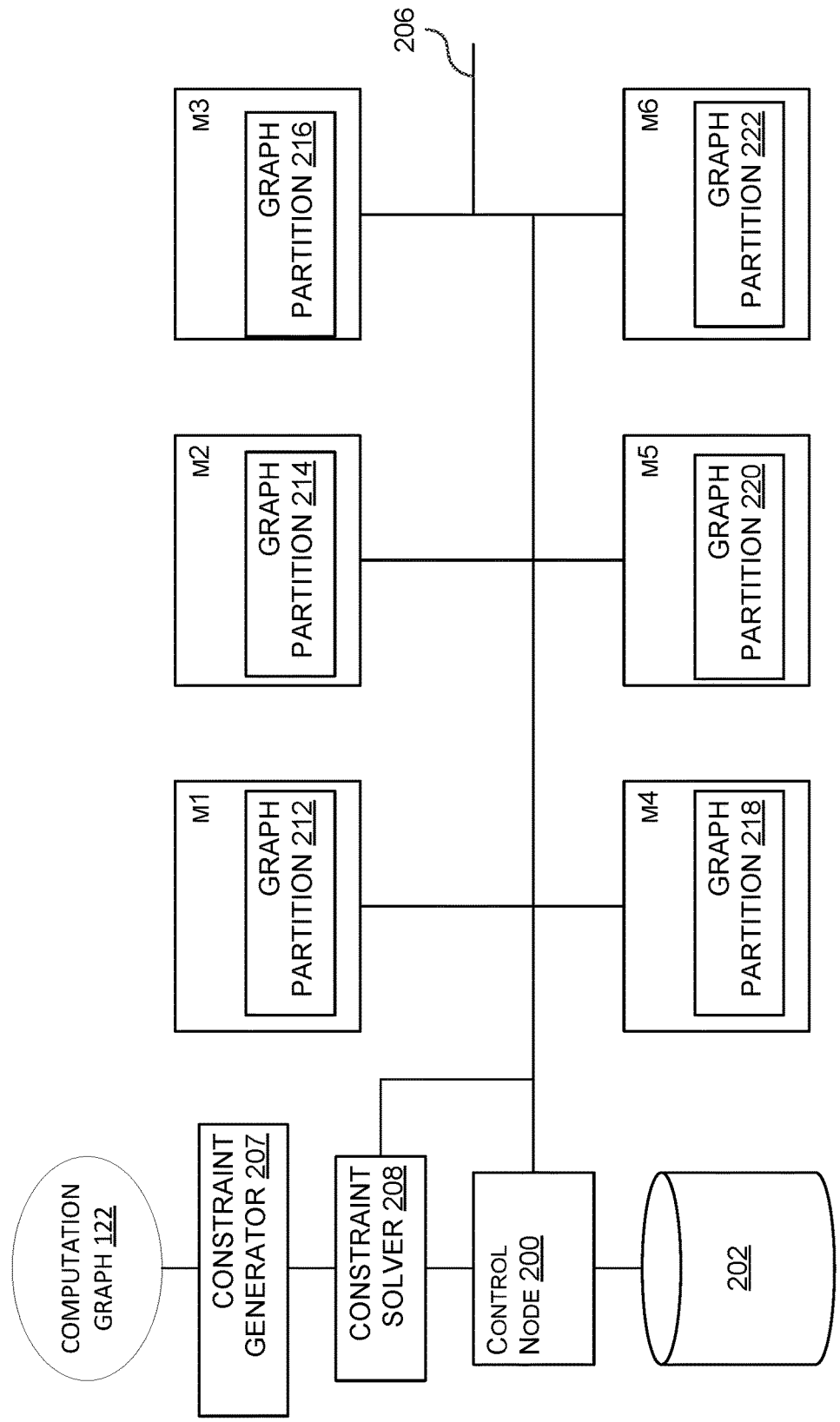
FIG. 2 is a schematic diagram of a plurality of machines and stages of an execution pipeline.

FIG. 2 is a schematic diagram of an execution pipeline such as that of FIG. 1 in more detail. A plurality of machines M1 to M6 are connected to one another via a communications link 206 and also are connected to a control node 200. The control node is connected to a constraint solver 208. The constraint solver 208 receives as input constraints which are computed by a constraint generator 207. The constraint generator 207 takes as input a computation graph 210 representing a machine learning model. The constraint generator also has access to information about the machines. The control node 200 is in communication with a store 202 of training data in examples where the machine learning model is to be trained. The control node receives a partitioning of the computation graph 210 from the constraint solver 208 and runs the computation specified in the computation graph according to the partition over the machines in the execution pipeline.

A machine is any computing device such as a graphics processing unit, machine learning accelerator, central processing unit, individual core of a central processing unit, trusted execution environment, virtual machine or any computation node.

In the example of FIG. 2 there are 6 machines but it is also possible to have other numbers of machines. Two or more machines are used.

The execution pipeline comprises a plurality of stages. Each stage is deployed at one or more of the machines according to a pre-specified mapping of stages of machines. In the example of FIG. 2 there is a one to one mapping between stages and machines so there is one machine per stage and each stage has a different machine. However, it is also possible to use other mappings between stages and machines.

Each stage is assigned part of the computation graph 210 where the part is a plurality of vertices of the computation graph 210. Therefore in FIG. 2, each machine has a different part of the computation graph 210. By dividing the computation graph between the stages model parallelism is achieved since different parts of the machine learning model are able to be executed at the same time.

The constraint solver 208 computes a partition of the computation graph 210 to produce graph partitions 212, 214, 216, 218, 220, 222 one per stage of ordered stages of an execution pipeline. The constraint solver takes as input constraints computed by a constraint generator 207. The constraint generator takes as input the vertices and edges of the computation graph. The constraint solver 208 computes the partition by assigning individual ones of the vertices to only one of the stages. The constraint solver is any one or more of: a pseudo-boolean optimizer (PBO), a SAT Integer Programming constraint solver (SAT), a Constraint Programming (CP) constraint solver, an answer set programming (ASP) constraint solver, a max satisfiability modulo theories (MaxSMT) constraint solver.

When inference or training of the machine learning model takes place by executing the pipeline, execution cost of the stages are balanced according to the computed partition. In this way the constraint solver and constraint generator are able to control how the execution cost of the stages are balanced and affect the efficiency of the execution pipeline. The constraint solver is configured to compute the partition with the aim that execution cost is balanced between individual ones of the stages.

In some examples a revision to the computation graph is computed before inputting the computation graph to the constraint generator, such that in use, the method is scalable to large scale machine learning models. Computing the revision comprises one or more of: serialization of operations which require more than a threshold amount of memory, recomputation, stashing of activations to external memory, stashing of weights to external memory.

The constraint generator 207 is configured to compute execution cost of individual ones of the stages by computing one or more of: a sum of individual execution cost of operations assigned to a machine which hosts the stage, an execution cost of sending and receiving messages in the machine which hosts the stage, an execution cost of stashing and reloading tensors in the machine which hosts the stage.

The constraint generator is configured to output one or more of the following correctness constraints: any vertex of the graph is assigned to one and only one stage, for any edge in the graph the origin of the edge is either assigned to the same stage as the destination or it is assigned to an earlier stage than the destination, the memory required by operations of a stage fits in memory capacity of a machine hosting the stage.

The constraint generator is configured to output a memory constraint whereby the memory required by operations of a stage fit in memory capacity of a machine hosting the stage, and wherein the constraint generator is configured to compute the memory capacity using one or more of: code size of operations assigned to the machine: size of tensors representing weights assigned to the machine: size of messages that live throughout execution of the stages: an amount of temporary memory which is live throughout execution of the stages: size of data to be stashed in the machine during execution of the stages. Implementing a memory constraint is found to be particularly effective in producing partitions of the graph that result in efficient operation of the pipeline.

The constraint generator optionally outputs one or more of the following constraints:
  for a given set of weights of the machine learning model vertices which use the set of weights are assigned to the same stage,
  if a vertex is known not to require any space for code it is assignable to the same stage as a vertex which consumes or produces the vertex,
  where the execution is to train the machine learning model then vertices representing operations in a forward pass of the training are assigned to stages labelled as forward while vertices representing operations in a backward pass of the training are assigned to stages labelled as backward.

In some examples the constraint generator is configured to compute the constraints such that execution cost is balanced between individual ones of the stages and also with the aim that data parallelism is implemented, whereby data is processed in parallel by individual ones of the partitions.

In some examples the constraint generator is configured to compute the constraints with the aim that execution cost is balanced between individual ones of the stages and also where the computation graph comprises a plurality of subgraphs which are executed in parallel.

In some examples the constraint solver is configured to compute the partition sequentially by allocating vertices to one of the stages before allocating vertices to another of the stages.

Figure 3:
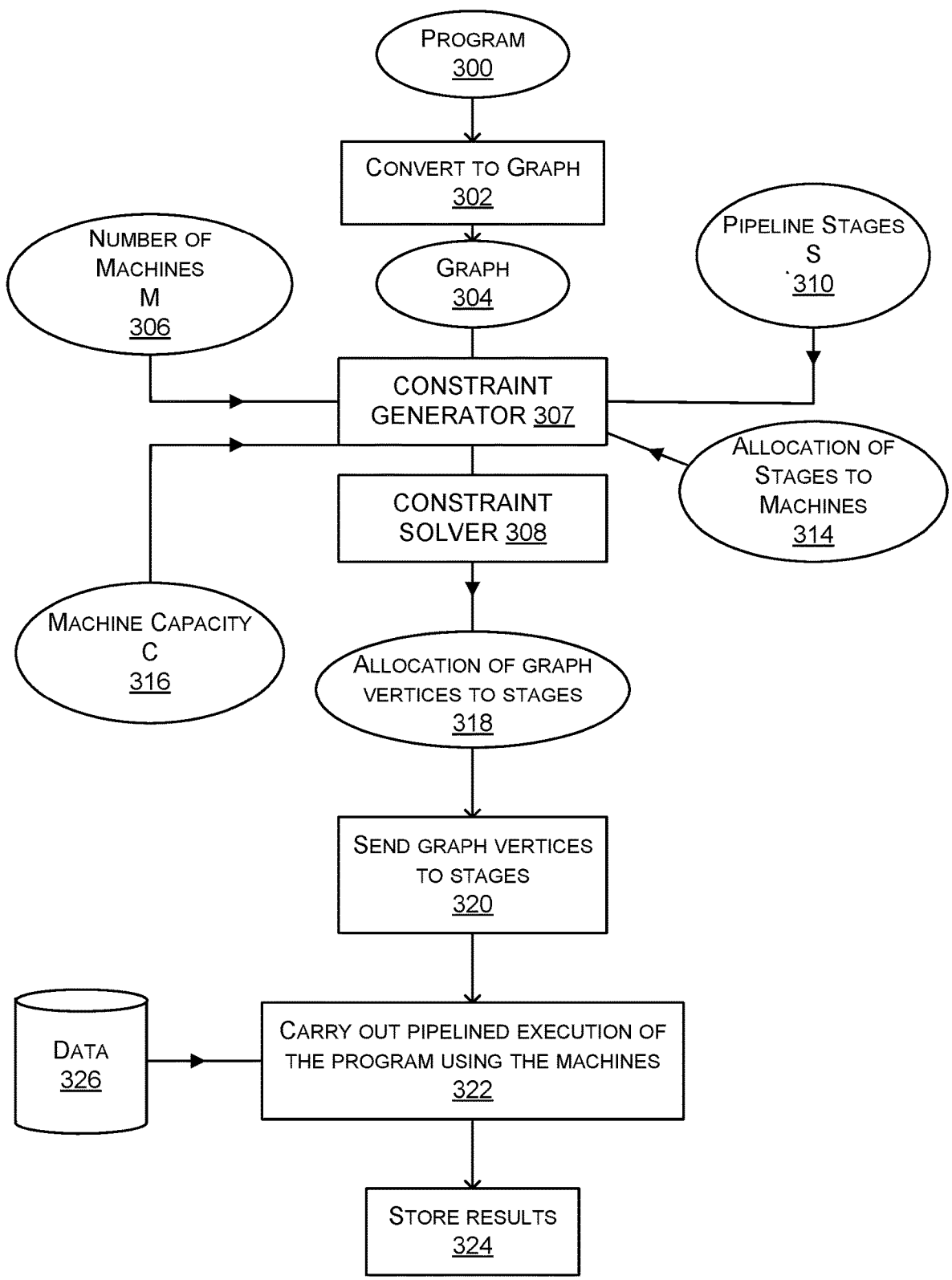
FIG. 3 is a schematic diagram of inputs to a constraint solver and an output of the constraint solver.

FIG. 3 is a schematic diagram of a constraint solver 308 such as that of FIG. 1 and FIG. 2. A machine learning model 300 is converted 302 to a graph being the computation graph 122 mentioned above. The computation graph comprises vertices connected by edges as mentioned above. The computation graph is sent as input to a constraint generator 307.

The constraint generator 307 also has information about an execution pipeline comprising a number of stages 310 of the pipeline, a number M of machines 306 on which the execution pipeline is deployed and information about memory capacity 316 of the machines. The constraint solver 308 has an allocation 314 or mapping of the stages to the machines.

The constraint generator 307 generates one or more constraints which vary according to the particular implementation. The constraints are input to the constraint solver 308. In a preferred example the constraints include the memory constraint mentioned above and all the correctness constraints mentioned above. This combination of constraints is found to give good working results whereby efficient pipeline execution is achieved.

Once the partition has been computed by the constraint solver 308 the allocation 318 of graph vertices to stages is done by sending 320 the graph vertices to the stages. Pipelined execution is carried out 322 using the machines and using data 326 sent by the control node as mentioned above. The results are stored 324.

Figure 4:
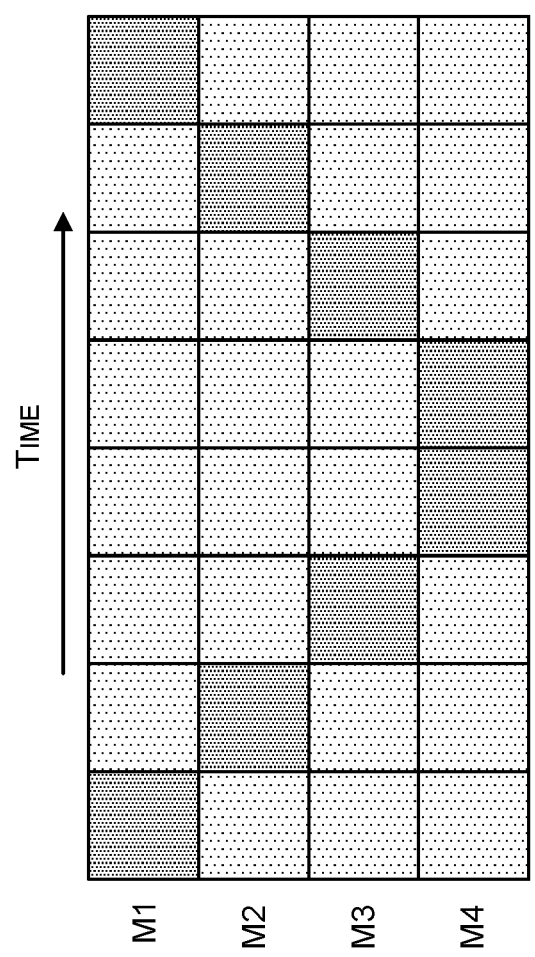
FIG. 4 is a schematic diagram of an execution pipeline having eight stages.

FIG. 4 shows an execution pipeline with 8 stages and four machines M1 to M4. Pale cells in the table of FIG. 4 denote idle times of a machine and it is seen that the arrangement of FIG. 4 is processing a single mini-batch. Machine M1 executes forward work in stage 1 and is then idle until stage 8 is reached at which point it executes backward work. Machine M2 is idle in the first stage, computes forward work in stage 2 and is then idle until stage 7 when it computes backward work. When the execution pipeline of FIG. 4 is used to process 8 batches in parallel, it eventually reaches a steady state where all machines M1 to M4 are busy.

A computation graph expresses a computation over a single set of inputs, which is referred to as a mini-batch. By executing a graph in pipelined parallel fashion it is possible to efficiently utilize multiple machines by executing different stages of the computation graph in parallel on multiple independent mini-batches. More specifically, in FIG. 5, columns of the table represent time, ordered stages are denoted by A, B, . . . , H, and independent mini-batches are denoted by integers 1 to 7. In the first column, machine 1 computes the first stage A for the first mini-batch; in the second column, machine 1 computes the first stage A for the second mini-batch while machine 2 computes the stage B for the first mini-batch, etc. When there is more than one computation per column (for example stage A for the second mini-batch and stage B for the first mini-batch in the second column), computations can be executed in arbitrary order sequentially because they are independent. The order does have implications in terms of the pipeline efficiency and fitting.

In a pipeline configuration like this one, some of the machines are idle for the very first few timestamps (e.g., only stage A is executed in timestamp 0), leaving machines M2, M3 and M4 idle). And for a few timestamps, while all the machines have code to run, they do not necessarily have the same amount of work to do. However, as more mini-batches are scheduled, the pipeline reaches a steady state, in timestamp 12, where all the different stages are scheduled, even though they all work in completely independent batches: the steady state represents the whole computation. Moreover, by increasing the number of batches per iteration, in theory, the computational and memory loads required are constant as the execution moves forward in the timestamp. Finally, the steady state represents the point in time where the network of machines is most utilized. In order to obtain a high utilization of the hardware, an aim is to balance the computational load of the stages assigned to every machine.

In examples the constraint solver identifies the layout of a steady state and finds an assignment of operations to stages that minimizes the computational load of the slowest machine while executing the pipeline. The slowest machine will dominate the execution cost of the steady state. Thus, minimizing this computational load means reducing the idle time of the other machines and consequently, improving pipeline efficiency.

Figure 5:
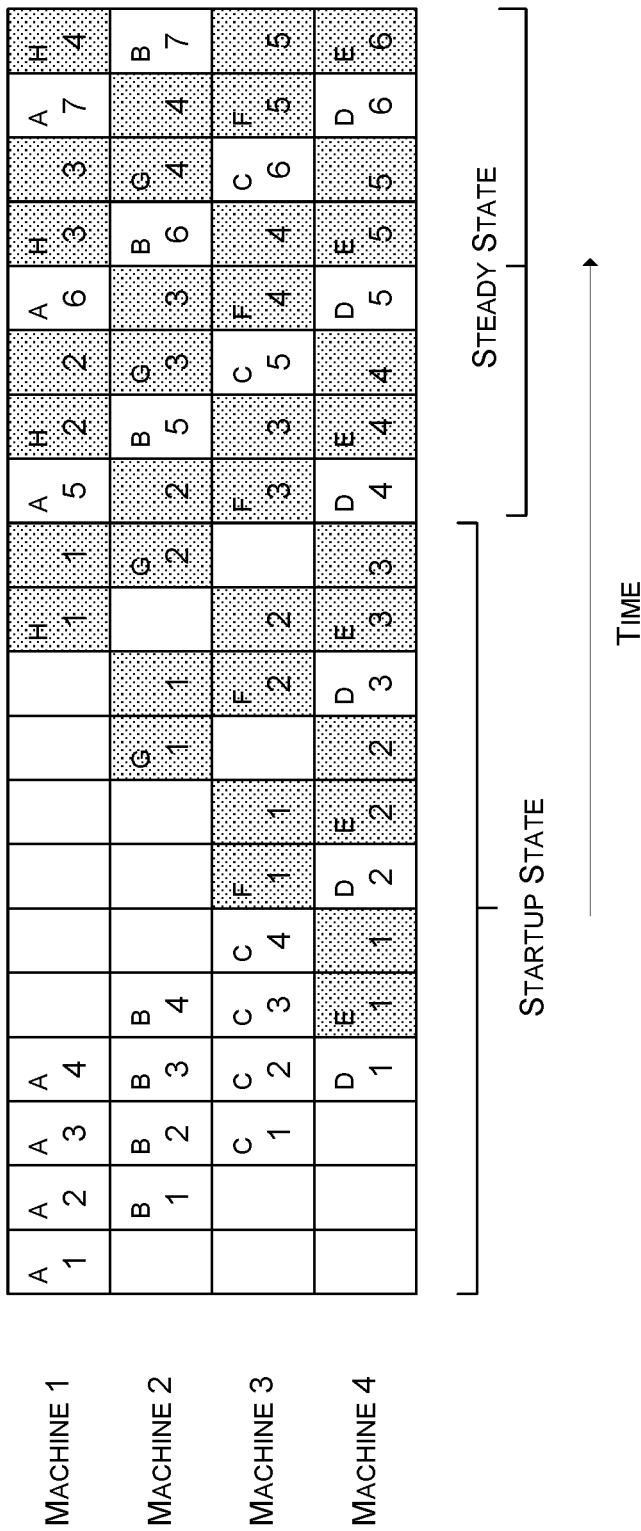
FIG. 5 is a schematic diagram of an execution pipeline with parallelization.

In examples the memory required by the vertices assigned to a machine (or to the stage of a machine) fit in the machine, given its capacity. In addition to space for code and for tensors that are created and freed throughout the execution of a machine learning model, the constraint solver is able to consider a buffer in each machine for communication between stages. The first stage assigned to every machine will store in this buffer all the tensors that will be used by the second stage. In FIG. 5, it is seen that for this specific configuration, the buffer will keep 5 copies of the output of stage A that needs to be used in stage H. The term "reuse distance" refers to the number of copies that need to be kept in the buffer.

FIG. 5 is an example of how an execution pipeline makes use of parallelization. There are four machines (Machine 1 to Machine 4 in the figure) and there are 8 stages A to H. There are seven mini-batches denoted 1 to 7. Each column represents a particular time instant called a time stamp so that the left most column has time stamp 0, the next column on the right has time stamp 1 and so on until time stamp 19 at the far right. The term "forward pass" is used to refer to a forward pass of a neural network training algorithm such as back propagation and the term "backward pass" is used to refer to a backward pass of the neural network training algorithm.

At time stamp 0, machine 1 processes stage A for a forward pass of mini batch 1 whilst machines 2 to 4 are idle.

At time stamp 1 machine 1 processes stage A for a forward pass of mini batch 2 whilst machine 2 processes stage B for a forward pass of mini batch 1 and machines 3 and 4 are idle.

At time stamp 2 machine 1 processes stage A for a forward pass of mini batch 3, machine 2 processes stage B for a forward pass of mini batch 2 and machine 3 processes stage C for a forward pass of mini batch 1.

At time stamp 3 machine 1 processes stage A for a forward pass of mini batch 4, machine 2 processes stage B for a forward pass of mini batch 3, machine 3 processes stage C for a forward pass of mini batch 2 and machine 4 processes stage D for a forward pass of mini batch 1.

At time stamp 4 machine 1 is idle. Machine 2 processes stage B for a forward pass of mini batch 4. Machine 3 processes stage C for a forward pass of mini batch 3. Machine 4 processes stage E of a backward pass for mini-batch 1.

At time stamp 5 machines 1 and 2 are idle. Machine 3 processes stage C for a forward pass of mini batch 4 and machine 4 processes stage E of a backward pass of mini batch 1. Note that backward pass computation takes longer than forward pass computation and this is represented in FIG. 5 by duplication. Each of the cells denoting a backward pass computation is duplicated in FIG. 5. In time stamp 5 the cell for machine 4 is a duplicate of the cell for machine 4 in time stamp 4.

At time stamp 6 machines 1 and 2 are idle. Machine 3 processes stage F for a backward pass of mini batch 1. Machine 4 processes stage D for a forward pass of mini batch 2.

At time stamp 7 machines 1 and 2 are idle. Machine 3 computes stage F for a backward pass of mini batch 1 and machine 4 computes stage E for a backward pass of mini batch 2.

At time stamp 8 machine 1 is idle. Machine 2 computes stage G for a backward pass of mini batch 1. Machine 3 is idle. Machine 4 computes stage E for a backward pass of mini batch 2.

At time stamp 9 machine 1 is idle. Machine 2 computes stage G for a backward pass of mini batch 1. Machine 3 computes stage F for a backward pass of mini batch 2. Machine 4 computes stage D for a forward pass of mini batch 3.

At time stamp 10 machine 1 computes stage H for a backward pass of mini batch 1, machine two is idle, machine 3 computes stage F for a backward pass of mini batch 2, machine 4 computes stage E for a backward pass of mini batch 3.

At time stamp 11 machine 1 computes stage H for a backward pass of mini batch 1, machine 2 computes stage G for a backward pass of mini batch 2, machine 3 is idle, machine 4 computes stage E for a backward pass of mini batch 3.

At time stamp 12 a steady state is reaches since all machines are busy. The steady state continues for the rest of the time stamps shown in the figure. The machines process the stages indicated by the letters for the mini batches indicated by the digits in the figure.

A detailed example is now given. This example is not intended to limit the scope of the disclosure but to give mathematical detail to facilitate understanding of the technology. It is noted that the following detailed example uses more constraints than necessary for a working solution and that it considers communication load as well as execution cost even though it is possible to consider only execution cost.

The Computation Graph

Represent a program as a directed acyclic graph G=(V, E), where the set of vertices V represent operations on tensors, and the set of edges E represent data and control dependencies between operations, i.e. an edge u v indicates that the output of operation u is consumed by operation v as an input. For control dependencies, an edge u v indicates that the operation v is scheduled after operation u. Throughout this example, use u, v∈V to denote vertices and u→v∈V to denote edges.

Software for generating constraints to be used by the constraint solver is able to call the following functions on vertices:

load(v), which returns the computational load of executing a vertex v (e.g., cycle count or time);

storeAndLoad(v), which returns the number of cycles it takes to store and load the output of vertex v;

static(v), which returns the number of bytes that a vertex v occupies in memory throughout the whole execution of the model (for example, code size if a vertex represents an operation and tensor size if it represents weights);

tensor(v), which returns the number of bytes that output of a vertex v occupies in memory.

These functions are used by the constraint solver to obtain information for calculating computational loads and memory requirements. Functions such as load and static are obtained from profiling information, that is, by compiling a model to a specific machine and training it for a certain amount of time, and using the profiling information to estimate the number of cycles and the code size of each vertex. Functions such as tensor and weights are obtained as part of the intermediate representation used to represent the graph in the machines' software stack. Use of profiling information is an example only: alternatively a manually written model is used for each of the vertex types to produce the same information.

Constraint Solver

The constraint solver partitions each graph into a sequence of stages, which are distributed across different machines. In an example, the constraint solver takes a graph G=(V, E), a number M of machines, a number S of stages and a machine capacity C, and assigns vertices to stage identifiers. Machine identifiers are denoted with m∈[M], where [M] is used as a short hand for the index set [1, . . . , M]. Stage identifiers are denoted with s [S]. Assume that the stage identifiers are ordered in the sense that vertices assigned to stage s∈[S] do not depend on a vertex assigned to stage s'>s in the future. Denote the assignment of stages to machines by m(s) and assume that the assignment is pre-specified. The set of stages assigned to machine m is denoted by $S_m \equiv \{s \in [S]: m(s)=m\}$. In an example, a set of stages belonging to machine m can be represented as $S_m = \{m, S-m+1\}$, $m \in [M]$.

In this example, the output of the constraint solver is an assignment of vertices to stages that minimizes the overall computational load of the machine learning model.

Model the assignment of vertices to stages with binary variables S(v, s)∈{0, 1}, for v∈V, s∈[S], to describe whether a vertex v is assigned to stage s: S(v, s)=1 iff v is assigned to s and S(v, s)=0 otherwise.

In addition, use two sets of auxiliary binary variables M(v, m)∈{0, 1} and L(v, s1, s2)∈{0, 1} defined as follows:

$$M(v,m)=1 \Leftrightarrow \Sigma_{s \in S_m} S(v,s)=1, \qquad \text{Equation 1}$$

$$L(v,s_1,s_2)=1 \Leftrightarrow S(v,s_1)=1 \wedge \Sigma_{v \to v' \in E} S(v',s_2) \geq 1 \qquad \text{Equation 2}$$

Here M (v, m)=1 indicates that a vertex v is assigned to a machine m and L(v, s1, s2)=1 indicates that vertex v assigned to stage s1 has a user in s2 where a user is a consuming vertex.

Given these binary variables, define computational load of stages assigned to a machine as the number of cycles it takes to execute all vertices assigned to those stages, and communication load as the number of cycles it takes to send and receive the results that are produced and consumed in the machine, respectively.

Definition 2.1 (Computational Load). The load of computation assigned to a machine is the sum of cycle counts of the vertices assigned to that machine. Note that this is one definition of computational load and other definitions are possible and used in some examples.

$$\text{Computation}(m, \mathcal{M}) \equiv \sum_{v \in V} \text{cost}(v) \cdot \mathcal{M}(v, m)$$

Definition 2.2 (Communication load). The communication load of a machine is the sum of cycle counts needed to send and receive data by any stage assigned to that machine. The following formula gives the communication cost for a conventional topology of the network of machines. Other topologies have different cost functions.

$$\text{Communication}(m; \mathcal{M}) \equiv \sum_{v \in V} \sum_{s \in S_m} \left( \sum_{s < s' \leq S} \mathcal{L}(v, s, s') \cdot \text{send}(v, m, m(s')) + \sum_{1 \leq s' < s} \mathcal{L}(v, s', s) \cdot \text{recv}(v, m(s'), m) \right)$$

Note that it is not necessarily expected to have a uniform load for sending and receiving tensors between different pairs of machines, i.e., these loads depend on the topology of the network of machines. Therefore, assume that the functions send(v, m, m') and recv(v, m, m') are defined in terms of tensor(v) and of a user-defined load of communication between pairs of machines.

The total load of the stages assigned to a machine is the sum of both computation and communication load of that machine.

Definition 2.3 (Total Load).

Cost(m;M)≡Computation(m;M)+Communication(m; M)(m∈ [M])

Find the values for variables in the domain of S, so that the constraint solver is able to minimize the execution cost of slowest machine in the steady state, i.e., the machine with the largest computational and communication load:

$$\underset{S,\mathcal{M},\mathcal{L}}{\text{minimize}} \underset{m \in [M]}{\max} \text{Cost}(m; \mathcal{M}),$$ (Equation 3)

subject to $\forall v \in V, \sum_{s \in [S]} S(v; s) = 1$ (Constraint 2.4)

$\forall u \to v \in E, \forall s' < s \in [S],$ (Constraint 2.5)
$\mathcal{L}(u, s, s') = 0$ $\forall m \in [M], \text{AlwaysLive}(m, \mathcal{M}, \mathcal{L}) +$ (Constraint 2.6)

MaxTemporary(m; S, $\mathcal{M}$) + BufferSize($\mathcal{M}$; $\mathcal{L}$) ≤ $C_m$.

+BufferSize$(M;L) \leq C_m$.

Note that auxiliary variables M and L are defined in Eqs. (1) and (2).

In constraint 2.4 all vertices are assigned and no vertex is replicated across multiple stages.

Constraint 2.4. Each vertex is assigned to one and only one stage.

$$\forall v \in V, \sum_{s \in [S]} S(v; s) = 1$$

In constraint 2.5 require that the user of a vertex is always executed in a later stage than the vertex itself. This is needed for the sake of correctness and means that both vertices of an edge are either assigned to the same stage, or the source is assigned to an earlier stage than the destination.

Constraint 2.5. The source of an edge must happen before the destination of the same edge.

$$\forall u \to v \in E, \forall s' < s \in [S], L(u,s,s')=0$$

Figure 6:
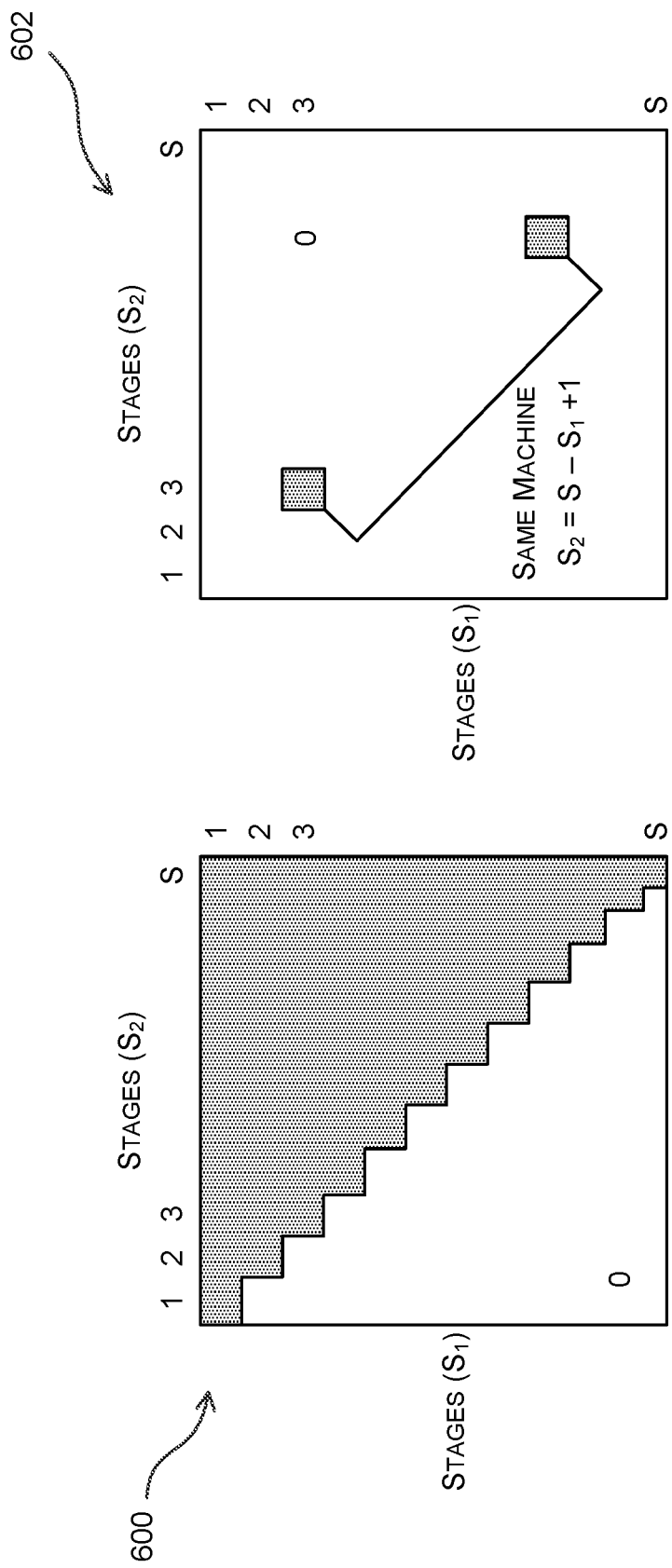
FIG. 6 is a schematic diagram of elements of a two-dimensional table for an arbitrary vertex, for each of two constraints.

Constraint 2.5 is visualized in the left panel of FIG. 6.

Constraint 2.6 requires that all vertices assigned to a machine fit there.

Namely, the sum of the always live memory and the maximum temporary memory required by those vertices, with the size of the buffer required for that machine is smaller than the given capacity Cm which may be different for each machine m.

FIG. 6 has visualizations of constraints 2.5 and 2.7. For each constraint, FIG. 6 shows the elements of the two-dimensional table L(v, s1, s2) for an arbitrary vertex v. Only the shaded pair of stages (s1, s2) is allowed to have a non-zero value.

The always live memory required by the vertices assigned to a given machine include the code size of those vertices, and the size of those vertices that represent weights and inputs. This information is given by the static(v) function for each vertex v.

(Equation 4)

$$\text{AlwaysLive}(m, \mathcal{M}, \mathcal{L}) \equiv \sum_{v \in V} \left( \text{static}(v) \cdot \mathcal{M}(v, m) + \sum_{s_1 \in S_m} \sum_{s_2 \in S_m} \text{tensor}(v) \cdot \mathcal{L}(v, s_1, s_2) \right)$$

Note that if two vertices of identical computation are assigned to the same machine, then they can share code, if such feature is available. In that case, it is possible to change the definition of always live memory to consider the kinds of computation of vertices assigned to a machine, rather than the vertices themselves. The space required for the temporary memory depends on the schedule of each stage, i.e., the execution order of the vertices assigned to a stage affects the maximum amount of live memory. A function live(v, m; S), is available which given a assignment S, tells how much memory is alive on machine m when v is executed. Given this function, define maximum temporary memory as follows:

MaxTemporary$(m;S,M) \equiv \max_{v \in V}(M(v,m) \cdot \text{live}(v,m;S))$.

Where this function is live it is possible to find the optimal schedule to each stage, or even take a predefined schedule and estimate its memory usage.

Local communication happens via a buffer, i.e., tensors produced in some earlier stage and consumed in one of the later stages on the same machine are stored in a buffer shared by both stages. This buffer should be large enough to keep D(s, s') instances of all the outputs of vertices assigned to stage s used in later stage s' for s' for s, s'∈ $S_m$. The function D(s, s') is given in advance.

In an example, define D (s, s') as the reuse distance D (s, s')=s'−s+1 if s, s'∈ [S] and s<s', and zero otherwise. This is the number of mini-batches that the stage s will execute until the result of the first mini-batch is consumed by stage s' assigned to the same machine as stage s. More generally if there is more than one stage that consumes the same output from an earlier stage on the same machine, then only count the last stage to avoid double counting.

Define buffer size as follows.

$$BufferSize(m; \mathcal{L}) \equiv \sum_{s \in S_m} \sum_{\substack{t \in S \ m \\ s < s'}} D(s, s') \cdot \sum_{v \in V} \text{tensor}(v) \cdot \mathcal{L}(v, s, s').$$

Constraint 2.6. The overall memory required by the set of vertices assigned to machine m should not exceed its capacity Cm.

$\forall m \in [M],$

AlwaysLive($m;M,L$)+MaxTemporary($m;S,M$)+BufferSize($m;L$)$\leq C_m$.

Additional Constraints

In addition to constraints 2.4, 2.5, and 2.6, consider two additional constraints as heuristics to reduce the search space size.

In the context of training neural networks, require that weights remain in the machine throughout the whole execution. This is not a requirement for correctness. However, given that typically the same set of weights are reused in every iteration, if they were to move between machines, the extra load of copying them and synchronizing their values from iteration to iteration would be significant. This decisions leads us to a configuration where the first and last stage are assigned to the same machine, as the weight update computation needs to happen in the same machine as the forward phase of the model.

In constraint 2.7 require that vertices representing weights are never copied from one machine to another.

Constraint 2.7. Weights remain in the same device.

$$\forall\, m \in \text{weights}(V), \sum_{s \in [S]} \sum_{\substack{s' \in [S] \\ m(s') \neq m(s)}} \mathcal{L}(u, s, s') = 0.$$

Here assume that the set of vertices that represent weights weights(V), such that weights(V)⊆V, is given by the user or found in an intermediate representation. Constraint 2.7 is visualized in the right panel of FIG. 6.

In the context of machine learning, there is often interest in running a computation graph representing the training step of a model represented as a differentiable function (commonly called a neural network model) on a variety of machines (CPUs, GPUs). In such a computation graph, vertices leading up to the loss computation are called forward operations and vertices that follow the loss computation are called backward operations. In this context, assuming that there are S=2M stages, it is reasonable to constrain a forward operation to be assigned to one of the first M stages and a backward operation to be assigned to one of the last M stages. More specifically, the following constraint is used.

Constraint 2.8. Forward operations and backward operations should be segregated.

$$\forall\, v \in \text{forwardOp}(V), \sum_{s \in 1,2,\ldots,M} S(v, s) = 1$$

$$\forall\, v \in \text{forwardOp}(V), \sum_{s \in M+1,\ldots,2M} S(v, s) = 1.$$

Here assume that the set of forward and backward operations forwardOp(V)⊆V, backwardOp(V)⊆V are provided by the user and forwardOp(V)∪backwardOp(V)=V.

The above framework can be extended in many ways such as for data parallelism, parallel execution of subgraphs, computation graph optimizations, and partitioning stages sequentially. At a high-level all these optimizations are combinable with the formulation of Equations 1 and 2 and are implemented as outer loops around the minimization problem of Equation 3.

Data parallelism is a technique to compute multiple mini-batches in parallel over multiple groups of machines: each group is often called a replica. Combine pipeline parallelism and data parallelism by dividing M available machines into r=M/M' groups of M' machines each.

Mini-batching involves processing b>1 data items at the same time (hence mini-batch) on each stage and machine. When one considers parallelizing across machines, it is possible to compare the parallelism that can be achieved within a machine (by increasing b) against the parallelism obtained by increasing the number of replicas r. Typically when one has a fixed budget of total machines M, the former leads to less replicas r but larger size of each group M' (allowing larger mini-batch size b within each replica) and the latter leads to more replicas with smaller number of machines per replica (and limited mini-batch size within a replica).

Figure 7:
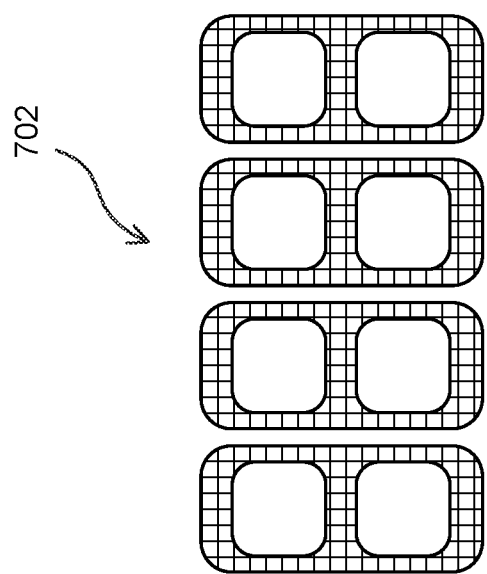
FIG. 7 is a schematic diagram of partitioning eight machines into two groups of size four or four groups of size two.
Figure 7:
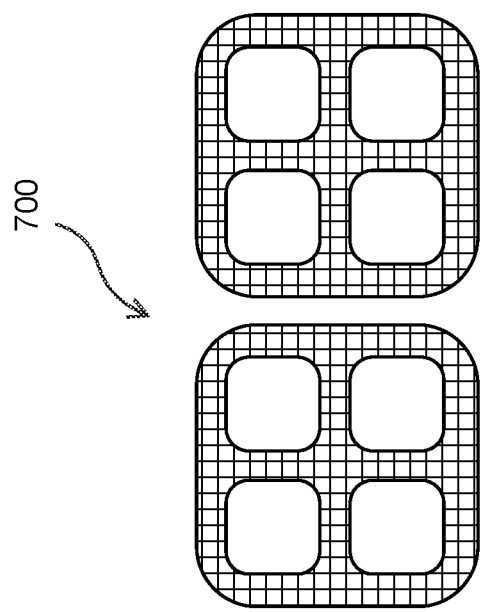

FIG. 7 has a comparison of two strategies to partition 8 machines into (a) 2 groups of size 4 or (b) 4 groups of size 2.

In order to maximize the throughput of the overall system, formulate an objective as maximize$_{b,p,r,M'}b \cdot r \cdot \text{eff}(p,M') \cdot (\text{InnerCost}(b,M')+\text{AllReduceCost}(r))^{-1}$, subject to InnerCost($b,M'$)=minimum cost for (3) with mini-batch size $b$ and $M'$ machines $b \cdot p \cdot r = B,$ $r \cdot M' = M.$ Here p is the number of mini-batches per iteration in the pipeline configuration, and eff (p, M') is a function that characterizes the pipeline efficiency and it depends on the pipeline configuration and the replica size M'. The pipeline efficiency eff (p, M') approaches 1 as p grows larger because the ramp-up and ramp-down phases become less dominant compared to the steady state as p grows larger. AllReduceLoad(r) is the time spend in synchronizing the replicas and it is a function of the number of replicas r. For example, for training a neural network model, this would correspond to aggregating the computed gradients.

As an illustration, in FIG. 7 consider dividing M=8 machines into (a) 2 replicas of size 4 or (b) 4 replicas of size 2. Assuming for simplicity that eff (p, M')=1 (the number of mini-batches per iteration p is large enough) and communication overhead AllReduceLoad(r)=0, configuration (a) is preferable to configuration (b), if $$\frac{2b_a}{\text{InnerCost}(b_a, 4)} > \frac{4b_b}{\text{InnerCost}(b_b, 2)},$$

where $b_a$ and $b_b$ denote the mini-batch size in the two configurations, respectively. In other words, configuration (a) is preferable to configuration (b), if (i)

$b_a=b_b=b$ and InnerCost(b,4)<InnerCost(b,2)/2, if (ii) InnerCost($b_a$,4)=InnerCost($b_b$,2) and $b_a>2b_p$, or the combination of the above two.

Note that pure data parallelism (no pipeline parallelism) is a special case of the above formulation when r=M and M'=1. Additionally, pure pipeline parallelism (no data parallelism) is a special case when r=1 and M'=M.

Parallel Execution of Subgraphs

If the input computation graph contains subgraphs that can be executed in parallel, it makes sense to extend the pipeline configuration to allow a stage to be assigned to more than one machine.

Figure 8:
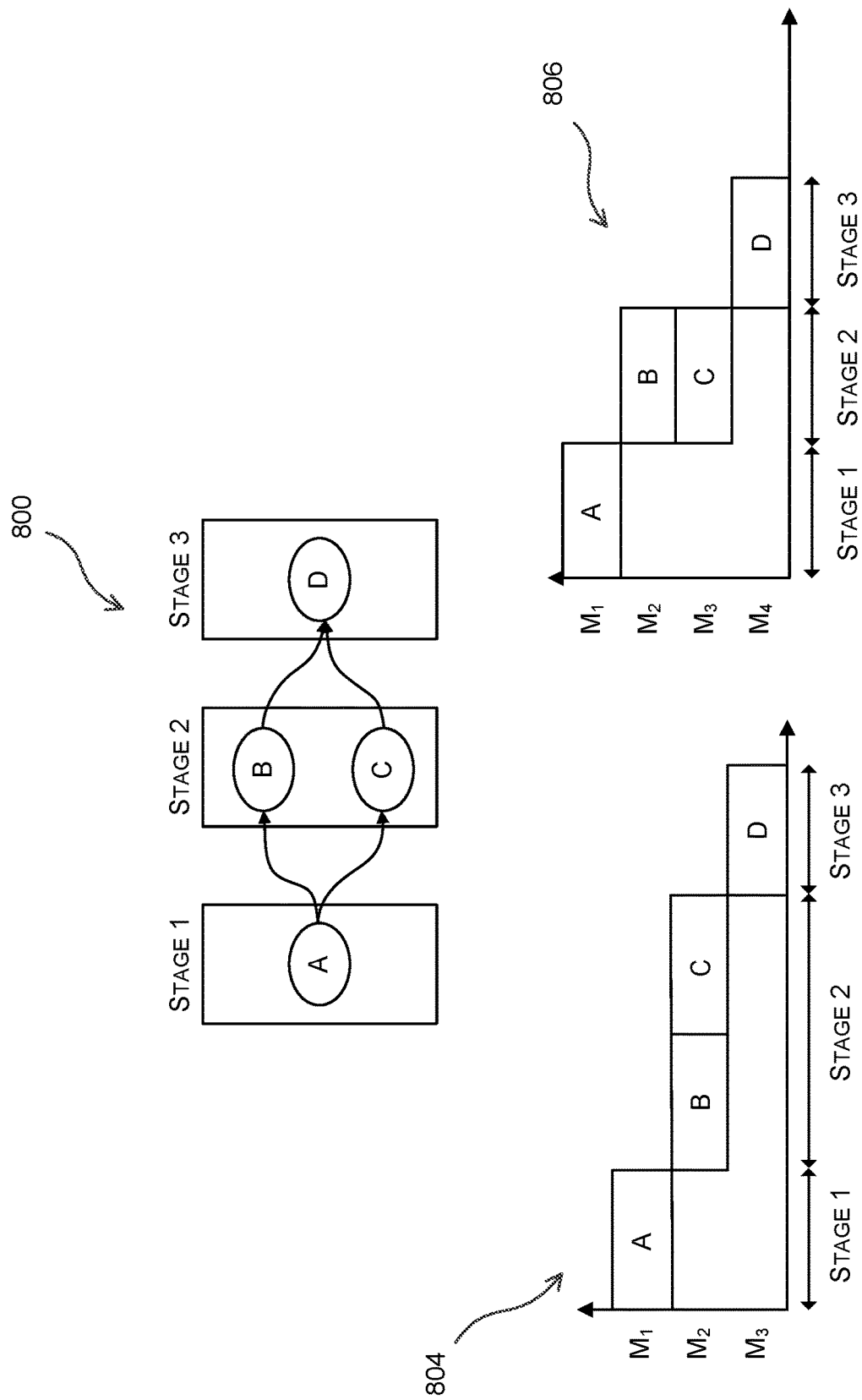
FIG. 8 is a comparison of executing a stage sequentially versus in parallel for a computation graph that includes data independent subgraphs.

As an illustration, in FIG. 8, compare two pipeline configurations sequential and parallel that lead to different optimal load in terms of the objective function of Equation 3 above. In the sequential configuration 804, the objective is dominated by stage 2, because subgraphs B and C are executed sequentially. In the parallel configuration 806, the pipeline is better balanced because every stage takes roughly the same amount of time.

FIG. 8 has a comparison of executing a stage sequentially versus in parallel for a computation graph that includes data independent subgraphs. Part 900 of FIG. 8 shows node B and C represent independent subgraphs that are executed in parallel. Part 804 of FIG. 8 shows a schedule corresponding to executing subgraphs B and C sequentially. Stage 2 takes a much longer time than stages 1 and 3 and the pipeline is imbalanced. Part 806 of FIG. 8 shows a schedule corresponding to executing subgraphs B and C in parallel. Stage 2 takes roughly the same time as stages 1 and 3 and the pipeline is better balanced.

Computation Graph Optimization

Computation graph optimization refers to rewriting the computation graph in a manner that preserves the correctness of the computation but achieves lower load. This includes for example, serialization of operations that require too much memory, recomputation, stashing of activations to external memory, and stashing of weights to external memory. Applying one of these optimizations, may potentially change the optimal partitioning of a computation graph across stages and the assignment of machines to replicas.

Nevertheless, as long as these optimizations can be expressed as changes to the input computation graph, the formulation of equation 3 above is applied to each output graph of such graph-level optimization and finds an optimal combination of graph-level optimization and partitioning of the graph for the most efficient pipeline/data parallelism.

Partitioning Stages Sequentially

In the formulation of equation 3, it is assumed that each stage is assigned to a single machine and all the inputs to the stage are alive during the execution of the entire stage. It is possible to relax this assumption by allowing stages to be partitioned sequentially and considering only the inputs to each substage to be alive within its duration. This approach is used to support removing code and other static data that is no longer needed after a vertex is executed from the memory of the machine.

The following section presents performance results given by the pipelining execution strategy.

The neural network model used in the evaluation was Resnet50 (trade mark) a convolutional neural network for image recognition run in training mode.

It is not possible to execute Resnet50 using batch size 1 in a single machine. The set of weights, vertex code and temporary tensors peaks at 368 MB, which exceed the device limit of 304 MB. However an estimate of the performance of single-machine execution was made by running the model on a software simulator. This shows the total number of cycles to process 1 input image is 3 million, which corresponds to a throughput of 433 samples/second.

Resnet50 was partitioned across 4 machines using pipeline parallelism as described herein. The total number of cycles to process 7 input images is 10.7 million, which corresponds to a throughput of 850 samples/second which is a significant improvement on the throughput of 433 samples/second in the case of single machine execution described above.

Figure 9:
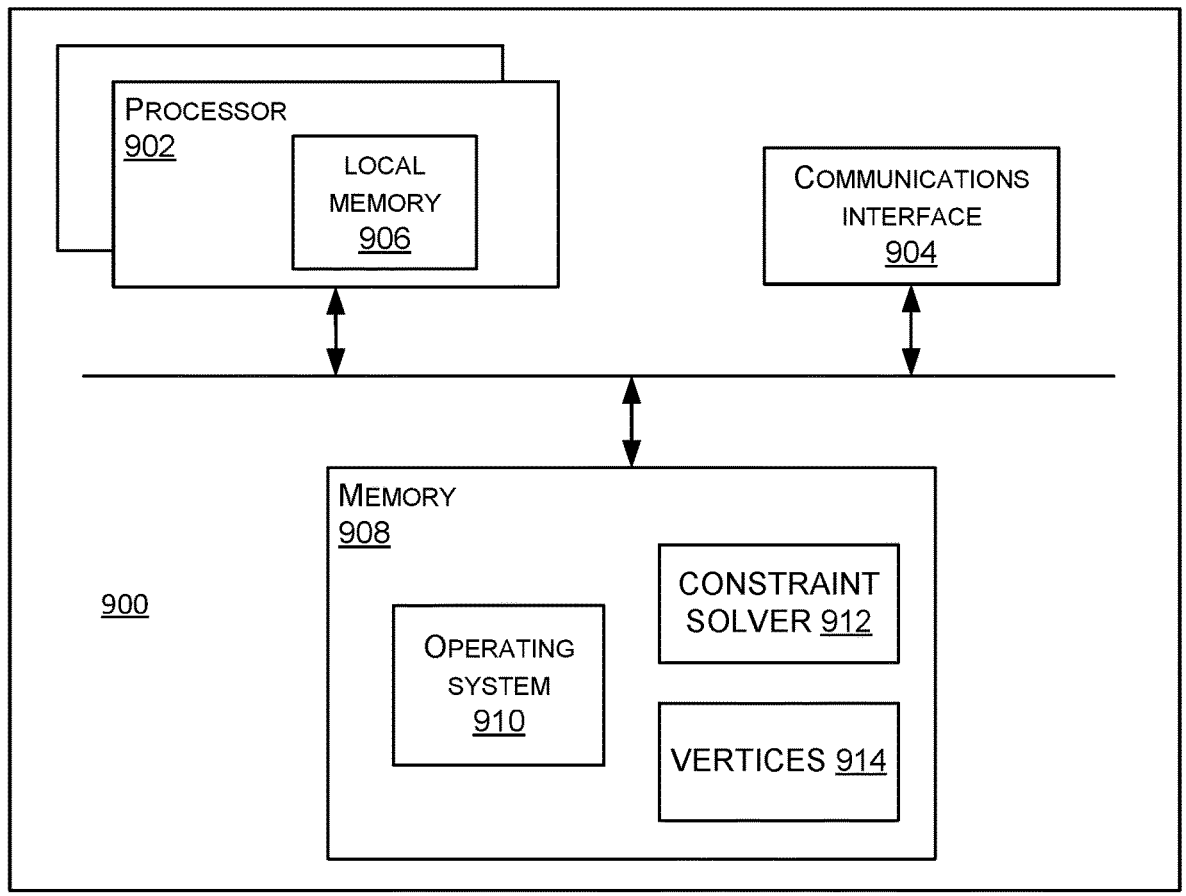
FIG. 9 illustrates an exemplary computing-based device in which embodiments of a control node, or a machine of a pipeline are implemented.

FIG. 9 illustrates various components of an exemplary computing-based device 900 which are implemented as any form of a computing and/or electronic device, and in which embodiments of a control node 200 or a machine M1 to M6 are implemented in some examples.

Computing-based device 900 comprises one or more processors 902 which are microprocessors, controllers or any other suitable type of processors for processing computer executable instructions to control the operation of the device in order to train a machine learning model, or process a data instance through a machine learning model, or partition a computation graph of a machine learning model between stages of an execution pipeline. In some examples, for example where a system on a chip architecture is used, the processors 902 include one or more fixed function blocks (also referred to as accelerators) which implement a part of the method of the methods of FIG. 2 and FIG. 3 in hardware (rather than software or firmware). Each processor 902 has local memory 906 in some examples. Platform software comprising an operating system 910 or any other suitable platform software is provided at the computing-based device to enable application software to be executed on the device such as a constraint solver 912, or operations corresponding to vertices 914 of a computation graph of a machine learning model.

The present disclosure encompasses the following examples set out as clauses.

Clause A. A computer-implemented method comprising:
  accessing a computation graph of a machine learning model from memory; and
  computing, using a constraint solver, a partition of the computation graph into ordered stages of an execution pipeline;
  such that in use, when inference or training of the machine learning model takes place by executing the pipeline, execution cost of the stages are balanced according to the computed partition.

Clause B. The computer-implemented method of clause A further comprising computing a revision to the computation graph before using the computation graph to compute the partition, such that in use, the method is scalable to large scale machine learning models, and wherein computing the revision comprises one or more of: serialization of operations which require more than a threshold amount of memory, recomputation, stashing of activations to external memory, stashing of weights to external memory.

Clause C. The computer-implemented method of clause A or B wherein the computation graph comprises a plurality of vertices connected by edges, where individual ones of the vertices represent operations of the machine learning model and individual ones of the edges represent communication between operations of the machine learning model.

Clause D. The computer-implemented method of clause C wherein the constraint solver computes the partition by assigning individual ones of the vertices to only one of the stages.

Clause E. The computer-implemented method of any preceding clause wherein the constraint solver is configured to compute the partition with an aim that execution cost comprising one or more of: execution cycles, execution time, energy use, is balanced between individual ones of the stages.

Clause F The computer-implemented method of clause E wherein the constraint solver is configured to compute execution cost of individual ones of the stages by computing one or more of: a sum of individual execution cost of operations assigned to a machine which hosts the stage, an execution cost of sending and receiving messages in the machine which hosts the stage, an execution cost of stashing and reloading tensors in the machine which hosts the stage.

Clause G The computer-implemented method of any preceding clause wherein the constraint solver is configured to implement one or more of the following correctness constraints: any vertex of the graph is assigned to one and only one stage, for any edge in the graph an origin of the edge is either assigned to the same stage as a destination or it is assigned to an earlier stage than the destination, the memory required by operations of a stage fits in memory capacity of a machine hosting the stage.

Clause H The computer-implemented method of any preceding clause wherein the constraint solver is configured to implement a memory constraint whereby the memory required by operations of a stage fit in memory capacity of a machine hosting the stage, and wherein the constraint solver is configured to compute the memory capacity using one or more of:
code size of operations assigned to the machine:
size of tensors representing weights assigned to the machine:
size of messages that live throughout execution of the stages:
an amount of temporary memory live throughout execution of the stages:
size of data to be stashed in the machine during execution of the stages.

Clause I The computer-implemented method of any preceding clause wherein the constraint solver implements one or more of the following constraints:
for a given set of weights of machine learning model vertices which use the set of weights are assigned to the same stage,
if a vertex is known not to require any space for code it is assignable to the same stage as a vertex which consumes or produces the vertex,
where the execution is to train the machine learning model then vertices representing operations in a forward pass of the training are assigned to stages labelled as forward while vertices representing operations in a backward pass of the training are assigned to stages labelled as backward.

Clause J The computer-implemented method of any preceding clause wherein the constraint solver is configured to compute the partition with the aim that execution cost is balanced between individual ones of the stages and also with the aim that data parallelism is implemented, whereby data is processed in parallel by individual ones of the partitions.

Clause K The computer-implemented method of any preceding clause wherein the constraint solver is configured to compute the partition with the aim that execution cost is balanced between individual ones of the stages and also where the computation graph comprises a plurality of subgraphs which are executed in parallel.

Clause L The computer-implemented method of any preceding clause wherein the constraint solver is configured to compute the partition sequentially by allocating vertices to one of the stages before allocating vertices to another of the stages.

Clause M The computer-implemented method of any preceding clause further comprising carrying out inference or training of the machine learning model by executing the pipeline.

Clause N The computer-implemented method of any preceding clause wherein the constraint solver is configured to compute the partition with the aim that execution cost is balanced between individual ones of the stages during a steady state of the execution pipeline.

Clause O, A machine comprising:
memory storing a computation graph of a machine learning model; and
a constraint solver which computes a partition of the computation graph into ordered stages of an execution pipeline:
such that in use, when inference or training of the machine learning model takes place by executing the pipeline, execution cost of the stages are balanced according to the computed partition.

Clause P, An execution pipeline comprising:
a plurality of ordered stages hosted on machines connected in a network of machines:
each of the stages comprising a partition of a computation graph of a machine learning model:
a constraint solver configured to compute the partition with the aim that execution cost is balanced between individual ones of the stages and to send the partition results to the stages.

Clause Q The execution pipeline of clause P wherein the constraint solver is configured to implement a memory constraint whereby the memory required by operations of a stage fit in memory capacity of a machine hosting the stage, and wherein the constraint solver is configured to compute the memory capacity using one or more of:
code size of operations assigned to the machine:
size of tensors representing weights assigned to the machine:
size of messages that live throughout execution of the stages:
an amount of temporary memory live throughout execution of the stages:
size of data to be stashed in the machine during execution of the stages.

Clause R The execution pipeline of clause P or Q wherein a constraint generator is configured to call the following functions in order to generate constraints for use by the constraint solver: load(v), which returns a computational load of executing a vertex v:
storeAndLoad(v), which returns a number of cycles it takes to store and load an output of vertex v:
static(v), which returns a number of bytes that a vertex v occupies in memory throughout the whole execution of the machine learning model:

tensor(v), which returns a number of bytes that output of a vertex v occupies in memory.

Clause S The execution pipeline of any of clauses P to R wherein the constraint solver is configured to implement one or more of the following correctness constraints: any vertex of the graph is assigned to one and only one stage, for any edge in the graph an origin of the edge is either assigned to the same stage as a destination or it is assigned to an earlier stage than the destination, the memory required by operations of a stage fits in memory capacity of a machine hosting the stage.

Clause T The execution pipeline of any of clauses P to S wherein the constraint solver is configured to compute execution cost of individual ones of the stages by computing one or more of: a sum of individual execution cost of operations assigned to a machine which hosts the stage, an execution cost of sending and receiving messages in the machine which hosts the stage, an execution cost of stashing and reloading tensors in the machine which hosts the stage.

The computer executable instructions are provided using any computer-readable media that is accessible by computing based device 900. Computer-readable media includes, for example, computer storage media such as memory 908 and communications media. Computer storage media, such as memory 908, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 908) is shown within the computing-based device 900 it will be appreciated that the storage is, in some examples, distributed or located remotely and accessed via a network or other communication link (e.g. using communication interface 904).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subgraph' is used herein to refer to a proper subgraph such that a subgraph of a graph does not comprise all the elements of the graph (i.e. at least one of the elements of the graph is missing from the subgraph).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method comprising:
accessing a computation graph of a machine learning model from memory, the computation graph comprising a plurality of vertices connected by edges, wherein the vertices represent operations of the machine learning model and the edges represent communication between operations of the machine learning model;
generating, using the vertices and edges of the computation graph, a constraint for the computation graph, wherein the constraint comprises at least one of:
for any edge in the graph, an origin of the edge is either assigned to the same stage as a destination or is assigned to an earlier stage than the destination,
for a weight of the machine learning model, vertices which use the weight are assigned to the same stage, or
if one of the vertices is known not to require any space for code, it is assignable to the same stage as another of the vertices which consumes or produces the one of the vertices; and
computing, using the constraint, a partition of the computation graph that includes graph partitions of serially ordered stages of an execution pipeline, wherein computing the partition comprises computing execution costs of the stages, and wherein computing the partition comprises computing the graph partitions using an allocation of the stages to machines on which the execution pipeline is deployed.

2. The computer-implemented method of claim 1 further comprising computing a revision to the computation graph before using the computation graph to compute the partition, such that in use, the method is scalable to a large scale machine learning model, and wherein computing the revision comprises one or more of: serialization of operations which require more than a threshold amount of memory, recomputation, stashing of activations to external memory, and stashing of weights to external memory.

3. The computer-implemented method of claim 1 wherein computing the partition comprises assigning individual ones of the vertices to only one of the stages.

4. The computer-implemented method of claim 1 wherein computing the partition comprises computing the partition such that the execution costs comprising one or more of: execution cycles, execution time, energy use, are balanced between individual ones of the stages.

5. The computer-implemented method of claim 4 wherein computing the execution costs of the stages comprises computing one or more of: a sum of individual execution cost of operations assigned to a machine which hosts the stage, an execution of sending and receiving messages in the machine which hosts the stage, an execution cost of stashing and reloading tensors in the machine which hosts the stage.

6. The computer-implemented method of claim 1 wherein the constraint comprises one or more of the following correctness constraints: any vertex of the graph is assigned to one and only one stage, the memory required by operations of a stage fits in memory capacity of a machine hosting the stage.

7. The computer-implemented method of claim 1 wherein generating the constraint comprises generating a memory constraint whereby the memory required by operations of a stage fit in memory capacity of a machine hosting the stage, further comprising computing the memory capacity using one or more of:
code size of operations assigned to the machine;
size of tensors representing weights assigned to the machine;
size of messages that live throughout execution of the stages;
an amount of temporary memory live throughout execution of the stages; or
size of data to be stashed in the machine during execution of the stages.

8. The computer-implemented method of claim 1 wherein where the execution is to train the machine learning model, vertices representing operations in a forward pass of the training are assigned to stages labelled as forward while vertices representing operations in a backward pass of the training are assigned to stages labelled as backward.

9. The computer-implemented method of claim 1 wherein computing the partition comprises computing the partition such that the execution costs are balanced between individual ones of the stages and that data parallelism is implemented, whereby data is processed in parallel by individual ones of the graph partitions.

10. The computer-implemented method of claim 1 further comprising carrying out inference or training of the machine learning model by executing the pipeline.

11. The computer-implemented method of claim 1 wherein computing the partition comprises computing the partition such that the execution costs are balanced between individual ones of the stages during a steady state of the execution pipeline.

12. The computer-implemented method of claim 1, wherein at least one of the ordered stages comprises at least two subgraphs of the computation graph that are executed in parallel.

13. The computer-implemented method of claim 1, wherein computing the partition of the computation graph comprises computing one of the graph partitions per stage.

14. The computer-implemented method of claim 1, wherein an output of each but a final stage of the serially ordered stages of the execution pipeline is an input to another stage of the serially ordered stages.

15. The computer-implemented method of claim 1, wherein generating the constraint comprises computing the constraint using pipeline information comprising one or more of: a number of the stages of the execution pipeline, a number of machines on which the execution pipeline is deployed, a memory capacity of one or more machines on which the execution pipeline is deployed.

16. The computer-implemented method of claim 1, further comprising carrying out inference or training of the machine learning model by executing the execution pipeline such that the execution costs of the stages are balanced according to the computed partition.

17. A machine comprising:
a memory storing a machine learning model;
a constraint generator which generates a constraint for a computation graph of the machine learning model using vertices and edges of the computation graph, wherein the vertices represent operations of the machine learning model and the edges represent communication between operations of the machine learning model, wherein the constraint comprises at least one of:

for any edge in the graph, an origin of the edge is either assigned to the same stage as a destination or is assigned to an earlier stage than the destination, for a weight of the machine learning model, vertices which use the weight are assigned to the same stage, or if one of the vertices is known not to require any space for code, it is assignable to the same stage as another of the vertices which consumes or produces the one of the vertices; and a constraint solver which uses the constraint to compute a partition of the computation graph that includes graph partitions of serially ordered stages of an execution pipeline, wherein computing the partition comprises computing execution costs of the stages, and wherein computing the partition comprises computing the graph partitions using an allocation of the stages to machines on which the execution pipeline is deployed.

18. An apparatus comprising:

an execution pipeline comprising ordered stages hosted on a machine, each of the stages comprising a graph partition of a computation graph of a machine learning model, the computation graph comprising vertices connected by edges, wherein the vertices represent operations of the machine learning model and the edges represent communication between operations of the machine learning model; and a constraint solver configured to:

compute the graph partitions using a constraint, wherein computing the graph partitions comprises computing execution costs of the stages, wherein the graph partitions are computed using an allocation of the stages to machines on which the execution pipeline is deployed, and wherein the constraint comprises at least one of:

for any edge in the graph, an origin of the edge is either assigned to the same stage as a destination or is assigned to an earlier stage than the destination, for a weight of the machine learning model, vertices which use the weight are assigned to the same stage, or if one of the vertices is known not to require any space for code, it is assignable to the same stage as another of the vertices which consumes or produces the one of the vertices; and send the partitions to the stages.

19. The apparatus of claim 18 wherein a constraint generator is configured to call the following functions in order to generate the constraint for use by the constraint solver:

load(v), which returns a computational load of executing a vertex v;

storeAndLoad(v), which returns a number of cycles it takes to store and load an output of vertex v;

static(v), which returns a number of bytes that a vertex v occupies in memory throughout the whole execution of the machine learning model; and tensor(v), which returns a number of bytes that output of a vertex v occupies in memory.

20. The apparatus of claim 18 wherein the constraint solver is configured to compute the execution costs by computing at least one of: an execution cost of sending and receiving messages in a machine which hosts a stage of the stages, or an execution cost of stashing and reloading tensors in the machine which hosts the stage.

* * * * *